United States Patent Office 3,568,469
Patented Mar. 9, 1971

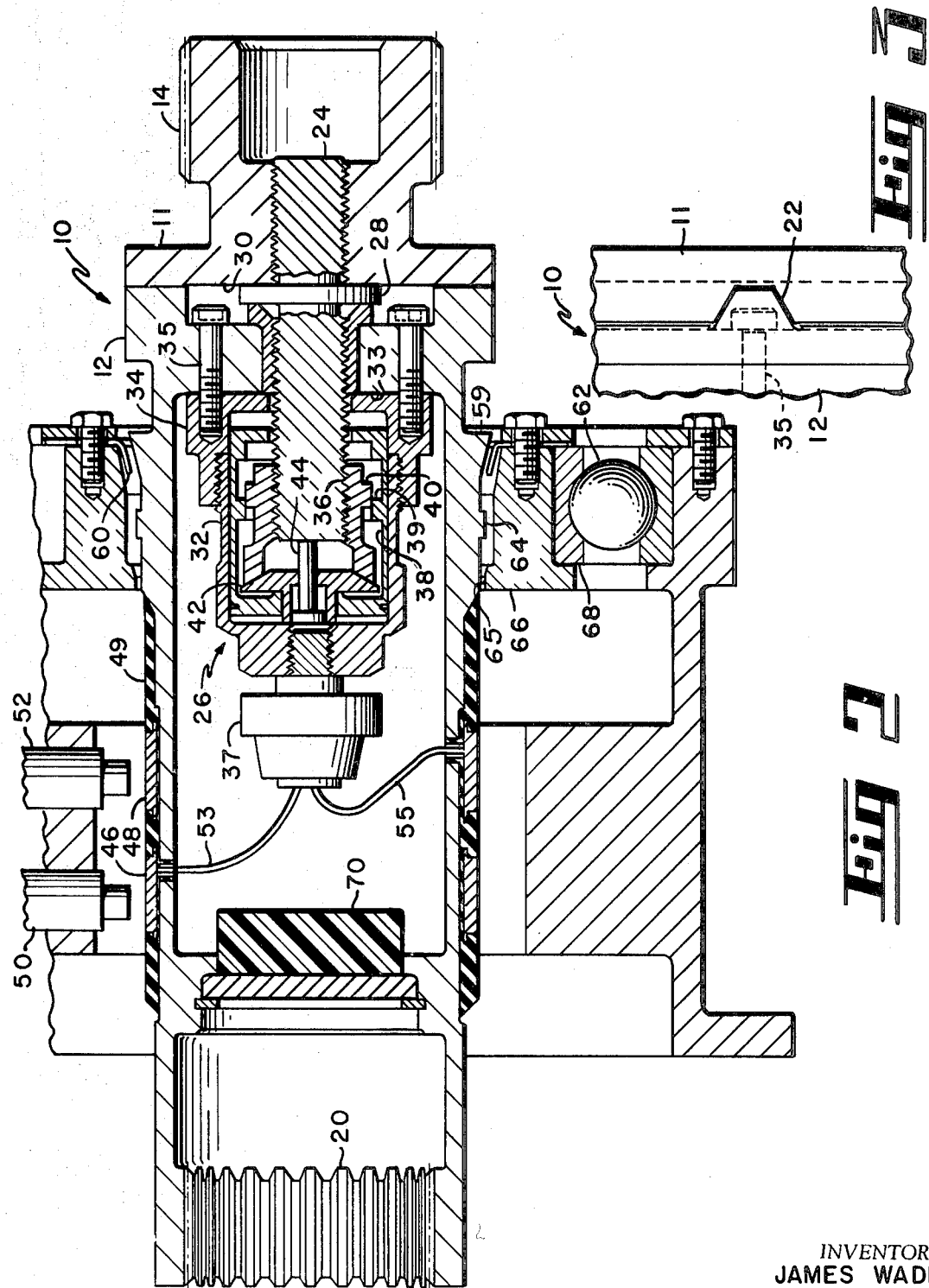

3,568,469
SYSTEM FOR INSTANTANEOUSLY DISCONNECTING A ROTATING LOAD
James Wade, Stratford, and Gordon L. Andrews, New Haven, Conn., assignors to Avco Corporation, Stratford, Conn.
Filed June 27, 1969, Ser. No. 837,015
Int. Cl. F16d 9/00
U.S. Cl. 64—28                 6 Claims

ABSTRACT OF THE DISCLOSURE

The disclosed equipment provides a system for instantaneously disconnecting a load from the output shaft of a gas turbine engine while the engine is operating at full power and speed. The equipment utilizes a connecting shaft constructed in two separable halves, the junction being in the form of a face spline held together by a single, axially positioned stud and an explosive nut. The shape of the face spline is such that the forces of rotation tend to instantaneously separate the two halves of the shaft when the explosive nut is released. The system includes means for preventing bounce-back, and a secondary bearing system for supporting the shaft after separation.

BACKGROUND OF THE INVENTION

Figure 1:
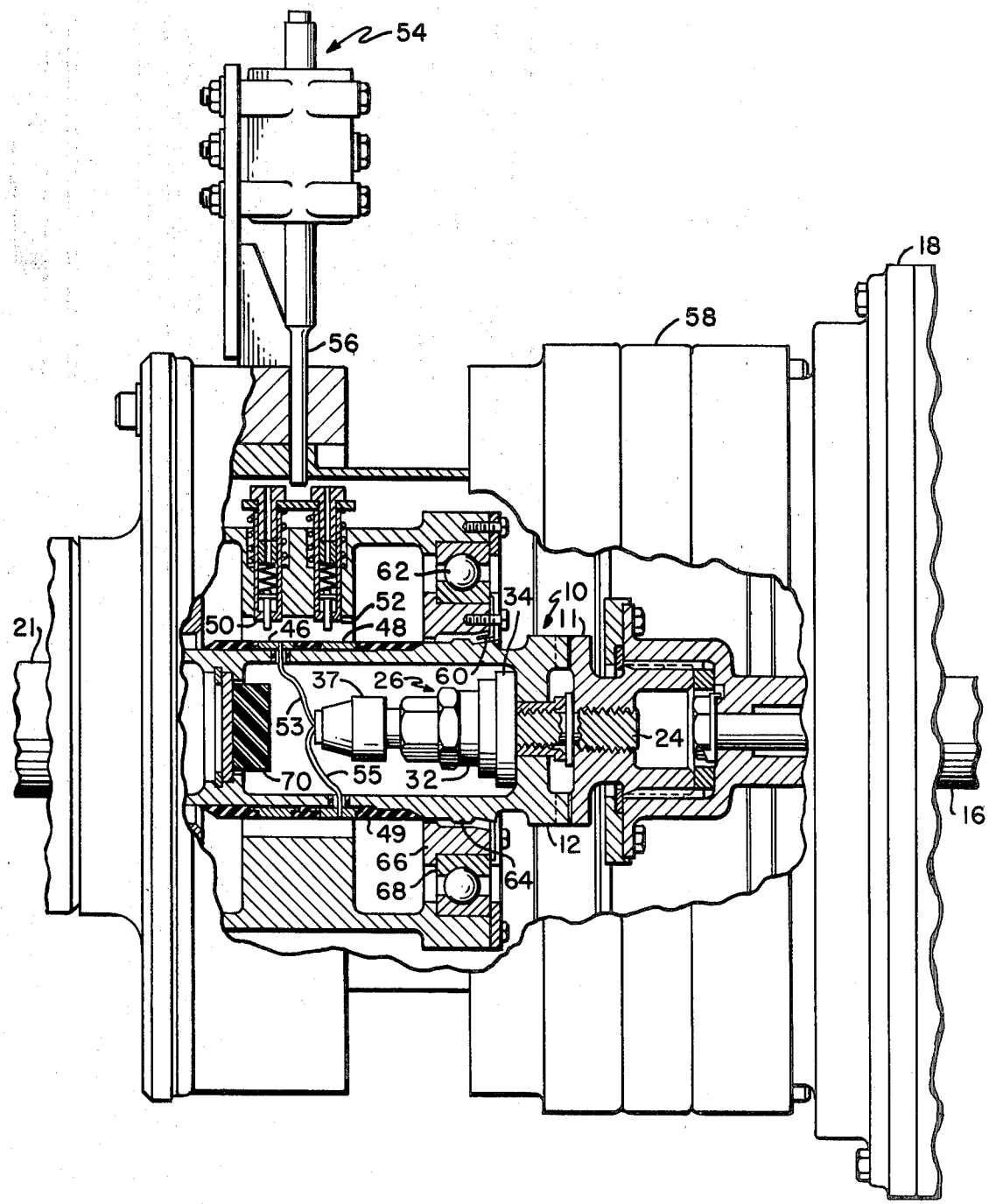

To meet Federal Aviation Authority requirements for the qualification of a gas turbine power plant intended for use in commercial aircraft, it is necessary to demonstrate that the engine can be controlled in the event of a sudden overspeed condition. For example, if the propeller shaft on one of the engines of a multi-engine aircraft should break, that engine would immediately tend to overspeed with catastrophic results. To avoid this, the control system for the engine must be able to detect the overspeed condition and rapidly reduce fuel flow before the dangerous condition occurs.

To test the engine capability under such conditions, a test ring must simulate the sudden rupture of a power shaft in flight. To do so, this invention provides a system capable of instantaneously disconnecting the applied load while operating the gas turbine at full power and speed, and this is accomplished positively and without damage to the power plant or to the power absorption device.

Briefly stated, the invention comprises an instantaneously separable connection between an engine and load. The connection consists of two aligned shafts joined by means of a face spline and positively held together axially by a single, axially positioned stud and an explosively releasable nut. The face spline teeth are tapered as trapezoids so that there is a natural separating force exerted between the two shafts. The explosively releasable nut contains an electrically initiated explosive which radially expands the nut segments and applies a separating force between the shafts. Shaft separation is caused by this force and by the force supplied at the face spline junction. Bounce-back is prevented by means of a ratchet-type conical spring. In addition, shaft separation results in the grounding of a normally ungrounded bearing to provide support for the end of the displaced shaft. The charge for the explosive within the nut is provided by means of conductive rings positioned on the shaft and with which contact is made by means of suitably positioned conductive plunger-type brushes.

THE DRAWINGS

FIG. 1 is a drawing showing the invention in its overall assembly;
FIG. 2 is an enlarged view of a portion of FIG. 1 showing certain details of the shaft and the explosive disconnect; and
FIG. 3 is a detail of the radial spline.

DESCRIPTION OF THE ILLUSTRATED EMBODIMENT

The present invention provides a test ring for simulating the operation of a gas turbine engine at the time of an output shaft failure. The ring comprises a split connecting shaft generally indicated at 10 made in two separable shafts, an engine connecting shaft 11 and a load connecting shaft 12. The engine connecting shaft 11 is provided with external splines 14 connected to the test engine output shaft 16 supported within the engine housing 18. The load connecting shaft 12 is connected by means of internal splines 20 to the load shaft 21 of a suitable test load, for example, a water brake (not shown). The end of the engine connecting shaft 11 is butted against the end of the engine output shaft, so that axial movement of the shaft 11 towards the engine is not possible. The shafts 11 and 12 are radially joined by means of tapered, trapezoidally shaped face splines 22. With this spline configuration there is a natural tendency for the shafts to axially separated when rotating. The shafts 11 and 12 are prevented from axially separating by means of a threaded stud 24 and an explosively releasable nut generally indicated at 26. The stud 24 is provided with an integral flange 28 which shoulders against the face 30 of the shaft 11.

The nut 26 is comprised of a fixedly positioned casing made up of a sleeve 32 threaded into a sleeve 34, which in turn is secured to an internal flange 33 on the shaft 12 by means of screws 35. One end of the nut 26 contains an explosive charge 37 which serves to axially displace several piston elements located within the casing. These elements include a plurality of internally threaded segments 36 which, when radially held in position, are threaded on to the stud 24 to hold the shafts 11 and 12 together. The segments are held in position by a locking piston 38 which is provided with a flange 39 which peripherally bears against complementary flanges 40 on the segments, thereby radially supporting the segments and securing the segments to the stud. The locking piston 38, when axially displaced, permits the segments 36 to move radially and disengage the stud 24. The segments 36 are positively displaced by means of a conically shaped separator piston 42. In addition, an ejector piston 44 imparts relative axial movement to the nut and stud.

The explosive charge 37 is electrically ignited by means of conductive rings 46 and 48 embedded in an insulator 49. Contact with the rings is made by means of plunger-type brushes 50 and 52, respectively, which are in turn simultaneously operated by means of an actuator, generally indicated at 54 and having an actuator rod 56. When the actutor rod is depressed, it moves both brushes 50 and 52 into engagement with the rings 46 and 48 connecting the charge to a suitable electrical source (not shown) through leads 53 and 55.

The shafts 11 and 12, along with the brushes, are mounted within a housing 58 which is fixedly secured to the engine housing 18. Except for the connecting shaft 12, all the various parts of the device are fixedly secured to the housing 58. The shaft 12 is angularly fixed with respect to the load shaft 21, but is axially movable on the splines 20. Therefore, when the charge is ignited, the shaft 11 remains axially stationary but the shaft 12 is axially separated therefrom and, as shown in the drawings, moves to the left. As best seen in FIG. 2, the outer periphery of the shaft 12 has a conically shaped portion 59 which when axially displaced moves past a conically shaped spring 60. The spring 60 acting as a ratchet permits the shaft 12 to move axially to the left but prevents it from moving back into engagement with the shaft 11.

The conical spring 60 is supported from a set of bearings 62 which are supported from the housing 58. While the shafts 11 and 12 are engaged, the bearings 62 are ungrounded and serve no function. However, when the shaft 12 is disengaged and is axially displaced to the left, a flange 64 on the outer periphery of the shaft 12 engages a flange 65 on the support 66 for the inner race 68 of the bearing 62, thereby grounding the bearing and supporting the right end of the shaft 12 after it has separated from the shaft 11.

When the charge 37 is detonated, a considerable number of fragments are propelled within the interior of the shaft 12. To protect the load, the interior bore of the shaft 12 is closed and padded by means of a plastic pad 70.

THE OPERATION

In operation the shafts 11 and 12 are rigidly connected so that the energy from an engine is coupled through an axial spline 14 on the shaft 11 to a load 21 through an axial spline 20, the shafts 11 and 12 being rigidly connected axially by means of the explosively releasable nut 26 and stud 24. In addition, the shafts 11 and 12 are radially interconnected by means of the trapezoidal splines 22. When the explosive charge 37 is detonated, the gases from the charge simultaneously displace three pistons axially to the right: (1) the axial displacement of locking piston 38 separates the flanges 39 and 40 to permit the radial separation of the segments 36 from the stud 24; (2) the axial displacement of the separator piston 42 positively separates the segments from the stud 24; and (3) the axial displacement of the ejector piston 44 imparts relative motion to the stud 24 and the nut 26, thereby tending to separate the shafts 11 and 12. In addition, because the radial spline between the shafts 11 and 12 is a trapezoid there is a natural tendency during rotation for these elements to axially separate. Accordingly, the shafts 11 and 12 will separate almost immediately upon the detonation of the charge 37.

Since the connecting shaft 11 bears against the engine, its displacement is not permitted. However, the shaft 12 is free to move axially with respect to the load. As it does so, the conical portion 59 moves past the conical spring 60, acting as a ratchet, and thereby prevents its bounceback when the shaft 11 comes to a stop against the load. Moreover, the flange 64 on the shaft comes into contact with the support 66 for the inner race 68 of the bearing 62 and thereby grounds the bearing to support the disconnected end of the shaft.

It will be apparent to persons skilled in the art that this invention is subject to various modifications and adaptations. It is intended therefore that the invention be limited only by the scope of the appended claims as interpreted in the light of the prior art.

We claim:

1. In a system for instantaneously disconnecting a loaded output shaft from a rotating power shaft, the combination comprising:
    a load-connecting shaft angularly fixed to said load shaft, but axially movable with respect thereto, and a hollow power-connecting shaft angularly and axially fixed to said power shaft, said load-connecting shaft and said power-connecting shaft being angularly fixed with respect to one another by means of complementary trapezoidally tapered face splines, the natural rotational forces between said complementary face splines tending to separate said load-connecting and said power-connecting shafts;
    and means for preventing the axial separation of said load-connecting shaft from said power-connecting shaft, said means comprising a threaded bolt and an explosively releasable nut, said nut and bolt securing said connecting shafts in axially abutting relationship, said shafts being separated when said nut is explosively released, said separation resulting from the reaction of the explosion of said nut and from said natural forces.

2. The invention as defined in claim 1 wherein said connecting shafts are hollow;
    an internal annular flange in each of said connecting shafts, said threaded bolt extending through said flanges, said nut being threaded onto said bolt and securing said flanges in abutting relationship.

3. The invention as defined in claim 1 and a housing for said load- and power-connecting shafts;
    a bearing supported in said housing, said bearing supporting said load-connecting shaft at the end adjacent said flange only when said shafts are separated, said bearing being out of supporting contact with said load-connecting shaft prior to separation, where said load-connecting shaft is supported by said bearing only after separation from said power-connecting shaft.

4. The invention as defined in claim 3 wherein said load-connecting shaft is provided with a conically shaped portion, and wherein a complementary-shaped conical spring is secured from said bearing, said portion and said spring cooperating as a ratchet and pawl, respectively, when said load-connecting shaft is axially separated from said power-connecting shaft.

5. The invention as defined in claim 4 wherein said bearing has an inner race, said inner race having a circumferential flange;
    a circumferential flange on said load-connecting shaft, said flanges contacting when said shafts are separated, said flanges providing the only supporting contact between said bearing and said load-connecting shaft.

6. The invention as defined in claim 5 wherein said shaft includes electrical connections to said bolt for electrically discharging said explosively releasable nut.

References Cited

UNITED STATES PATENTS

| | | | |
|---|---|---|---|
| 2,083,037 | 6/1937 | Schmittgen | 64—28X |
| 2,862,375 | 12/1958 | Miller | 64—28 |
| 3,220,218 | 11/1965 | Rio et al. | 64—28 |

MILTON KAUFMAN, Primary Examiner

U.S. Cl. X.R.

192—82